United States Patent
Young

(10) Patent No.: US 10,467,373 B2
(45) Date of Patent: Nov. 5, 2019

(54) METHOD OF SELECTING ROUTING RESOURCES IN A MULTI-CHIP INTEGRATED CIRCUIT DEVICE

(71) Applicant: Xilinx, Inc., San Jose, CA (US)

(72) Inventor: Jay T. Young, Louisville, CO (US)

(*) Notice: Subject to any disclaimer, the term of this patent is extended or adjusted under 35 U.S.C. 154(b) by 67 days.

(21) Appl. No.: 15/901,761

(22) Filed: Feb. 21, 2018

(65) Prior Publication Data

US 2019/0258767 A1     Aug. 22, 2019

(51) Int. Cl.
*G06F 17/50* (2006.01)
*H01L 25/065* (2006.01)

(52) U.S. Cl.
CPC ...... *G06F 17/5072* (2013.01); *H01L 25/0657* (2013.01); *G06F 2217/40* (2013.01); *H01L 2225/06513* (2013.01); *H01L 2225/06544* (2013.01); *H01L 2225/06582* (2013.01)

(58) Field of Classification Search
CPC .......................... G06F 17/5072; G06F 17/5077
USPC ......................................................... 716/125
See application file for complete search history.

(56) References Cited

U.S. PATENT DOCUMENTS

| | | | |
|---|---|---|---|
| 5,521,837 A | 5/1996 | Frankle et al. | |
| 6,907,593 B2* | 6/2005 | Teig | G06F 17/5072 716/129 |
| 7,143,369 B1 | 11/2006 | Milne | |
| 7,398,498 B2* | 7/2008 | Teig | G06F 17/5077 716/129 |
| 7,577,933 B1* | 8/2009 | Wu | G06F 17/5077 716/119 |
| 8,386,990 B1 | 2/2013 | Trimberger et al. | |
| 8,418,115 B1 | 4/2013 | Tom et al. | |
| 8,473,851 B2 | 6/2013 | DeGrazia | |
| 2015/0118793 A1* | 4/2015 | Jang | G06F 17/5077 438/107 |
| 2018/0157782 A1* | 6/2018 | Rossi | G06F 17/5077 |

\* cited by examiner

*Primary Examiner* — Suresh Memula
(74) *Attorney, Agent, or Firm* — John J. King

(57) ABSTRACT

A method of selecting routing resources in a multi-chip integrated circuit device is described. The method comprises placing a design on the multi-chip integrated circuit device; estimating a number of vias required to enable connections between chips of the multi-chip integrated circuit device that is placed with a portion of the design; identifying an area of a chip having a number of vias that is greater than a maximum number of vias for the area of the chip; selecting a partition window defining resources in the chip that is placed with the portion of the design, where in the partition window is selected to allow the number of vias to meet a maximum requirement of vias for the partition window; and re-placing the portion of the design within the partition window so that the number of vias in the area of the chip is within the maximum number of vias for the area.

20 Claims, 7 Drawing Sheets

|    | 1   | 2   | 4  | 6  | 8  | 10 | 12 | 14 | 16 | 18 | 20 |
|----|-----|-----|----|----|----|----|----|----|----|----|----|
| 2  | 119 | 107 | 98 | 94 | 92 | 91 | 90 | 90 | 90 | 89 | 89 |
| 4  | 110 | 97  | 86 | 81 | 78 | 76 | 75 | 75 | 74 | 74 | 73 |
| 6  | 105 | 90  | 77 | 71 | 68 | 66 | 65 | 64 | 63 | 63 | 63 |
| 8  | 102 | 84  | 70 | 63 | 60 | 58 | 57 | 56 | 55 | 55 | 54 |
| 10 | 101 | 80  | 65 | 59 | 56 | 54 | 53 | 52 | 52 | 51 | 51 |
| 12 | 99  | 76  | 62 | 56 | 53 | 51 | 50 | 49 | 48 | 48 | 48 |
| 14 | 98  | 73  | 59 | 54 | 50 | 49 | 48 | 47 | 46 | 45 | 45 |
| 16 | 96  | 68  | 55 | 49 | 46 | 44 | 43 | 42 | 41 | 40 | 40 |
| 18 | 95  | 66  | 53 | 47 | 44 | 43 | 42 | 41 | 40 | 40 | 39 |
| 20 | 97  | 67  | 54 | 49 | 46 | 45 | 44 | 43 | 42 | 42 | 41 |

FIG. 8

|    | 1   | 2   | 4   | 6   | 8   | 10  | 12  | 14  | 16  | 18  | 20  |
|----|-----|-----|-----|-----|-----|-----|-----|-----|-----|-----|-----|
| 2  | 100 | 101 | 103 | 105 | 107 | 108 | 109 | 110 | 111 | 111 | 113 |
| 4  | 102 | 104 | 106 | 109 | 111 | 114 | 115 | 118 | 119 | 120 | 122 |
| 6  | 104 | 107 | 109 | 112 | 115 | 119 | 120 | 124 | 125 | 127 | 130 |
| 8  | 106 | 111 | 112 | 115 | 119 | 122 | 124 | 128 | 130 | 131 | 136 |
| 10 | 108 | 116 | 116 | 118 | 121 | 125 | 127 | 131 | 133 | 135 | 139 |
| 12 | 111 | 121 | 120 | 122 | 124 | 128 | 130 | 134 | 137 | 138 | 143 |
| 14 | 113 | 126 | 123 | 124 | 127 | 130 | 133 | 137 | 139 | 142 | 146 |
| 16 | 115 | 132 | 128 | 129 | 131 | 134 | 136 | 141 | 143 | 146 | 151 |
| 18 | 117 | 137 | 133 | 132 | 134 | 137 | 139 | 144 | 147 | 150 | 154 |
| 20 | 118 | 141 | 136 | 135 | 136 | 139 | 141 | 145 | 148 | 150 | 156 |

FIG. 9

|    | 1   | 2   | 4   | 6   | 8   | 10  | 12  | 14  | 16  | 18  | 20  |
|----|-----|-----|-----|-----|-----|-----|-----|-----|-----|-----|-----|
| 2  | 100 | 105 | 114 | 124 | 132 | 140 | 144 | 150 | 152 | 154 | 160 |
| 4  | 100 | 107 | 119 | 133 | 144 | 158 | 163 | 174 | 179 | 185 | 194 |
| 6  | 100 | 107 | 123 | 140 | 154 | 170 | 178 | 193 | 199 | 207 | 222 |
| 8  | 100 | 108 | 125 | 144 | 161 | 178 | 188 | 205 | 215 | 221 | 241 |
| 10 | 100 | 108 | 125 | 145 | 164 | 182 | 193 | 213 | 222 | 230 | 249 |
| 12 | 100 | 108 | 126 | 146 | 166 | 185 | 199 | 217 | 231 | 240 | 261 |
| 14 | 100 | 108 | 126 | 147 | 166 | 187 | 202 | 221 | 234 | 251 | 268 |
| 16 | 100 | 108 | 127 | 150 | 170 | 193 | 208 | 232 | 242 | 261 | 284 |
| 18 | 100 | 108 | 127 | 149 | 170 | 194 | 210 | 234 | 248 | 267 | 289 |
| 20 | 100 | 107 | 126 | 148 | 170 | 192 | 208 | 231 | 250 | 262 | 294 |

FIG. 10

|    | 1   | 2   | 4   | 6   | 8   | 10  | 12  | 14  | 16  | 18  | 20  |
|----|-----|-----|-----|-----|-----|-----|-----|-----|-----|-----|-----|
| 2  | 100 | 100 | 100 | 100 | 100 | 100 | 100 | 100 | 100 | 100 | 100 |
| 4  | 102 | 103 | 102 | 102 | 102 | 102 | 102 | 102 | 102 | 102 | 102 |
| 6  | 105 | 107 | 105 | 105 | 104 | 104 | 104 | 104 | 104 | 104 | 104 |
| 8  | 108 | 112 | 109 | 108 | 107 | 107 | 107 | 106 | 106 | 106 | 106 |
| 10 | 111 | 118 | 113 | 111 | 110 | 109 | 109 | 109 | 108 | 108 | 108 |
| 12 | 114 | 124 | 118 | 115 | 113 | 112 | 111 | 111 | 110 | 110 | 110 |
| 14 | 116 | 131 | 123 | 118 | 116 | 115 | 114 | 113 | 112 | 112 | 112 |
| 16 | 120 | 138 | 129 | 123 | 120 | 118 | 117 | 116 | 115 | 115 | 114 |
| 18 | 122 | 145 | 134 | 127 | 124 | 121 | 120 | 119 | 119 | 117 | 117 |
| 20 | 124 | 151 | 138 | 131 | 127 | 124 | 122 | 121 | 120 | 120 | 118 |

FIG. 11

METHOD OF SELECTING ROUTING RESOURCES IN A MULTI-CHIP INTEGRATED CIRCUIT DEVICE

TECHNICAL FIELD

The present invention relates generally to integrated circuit devices, and in particular, to a method of enabling selecting routing resources in a multi-chip integrated circuit device.

BACKGROUND

The technology used in implementing circuit elements in integrated circuit devices continue to progress. For example, the dimensions of transistors of the integrated circuit devices continue to shrink, leading to increased performance. Similarly, the demands related to the capacity of integrated circuit devices also continue to increase, leading to more circuits resources being implemented on an integrated circuit device.

However, the effort to increase the capacity of integrated circuit devices by implementing larger integrated circuit devices may often lead to arrangements that reduce performance. One way to increase the capacity of an integrated circuit device is to increase the number of chips (where a chip is also commonly known as a die) in the integrated circuit device. For example, Multi-Chip Module (MCM) integrated circuit devices comprise an interposer device having a plurality of individual chips that are adapted to communicate by way of traces in the interposer. Such an arrangement can lead to wire lengths (WLs) of traces between the chips that are long, resulting in reduced performance in circuits in the chips of the integrated circuit device.

Accordingly, there is a need for improved methods of and systems for routing resources in a multi-chip integrated circuit device.

SUMMARY

A method of selecting routing resources in a multi-chip integrated circuit device is described. The method comprises placing a design on the multi-chip integrated circuit device; estimating a number of vias required to enable connections between chips of the multi-chip integrated circuit device that is placed with a portion of the design; identifying an area of a chip having a number of vias that is greater than a maximum number of vias for the area of the chip; selecting a partition window defining resources in the chip that is placed with the portion of the design, where in the partition window is selected to allow the number of vias to meet a maximum requirement of vias for the partition window; and re-placing the portion of the design within the partition window so that the number of vias in the area of the chip is within the maximum number of vias for the area.

A system is also described and comprises a processor; and a computer-readable medium storing instructions which, when executed by the processor, cause the processor to perform operations, the operations comprising: placing a design on the multi-chip integrated circuit device; estimating a number of vias required to enable connections between chips of the multi-chip integrated circuit device that is placed with a portion of the design; identifying an area of a chip having a number of vias that is greater than a maximum number of vias for the area of the chip; selecting a partition window defining resources in the chip that is placed with the portion of the design, where in the partition window is selected to allow the number of vias to meet a maximum requirement of vias for the window; and re-placing the portion of the design within the partition window so that the number of vias in the area of the chip is within the maximum number of vias for the area.

A non-transitory computer-readable medium storing instructions which, when executed by a processor, cause the processor to perform operations, the operations comprising: placing a design on the multi-chip integrated circuit device; estimating a number of vias required to enable connections between chips of the multi-chip integrated circuit device that is placed with a portion of the design; identifying an area of a chip having a number of vias that is greater than a maximum number of vias for the area of the chip; selecting a partition window defining resources in the chip that is placed with the portion of the design, where in the partition window is selected to allow the number of vias to meet a maximum requirement of vias for the window; and re-placing the portion of the design within the partition window so that the number of vias in the area of the chip is within the maximum number of vias for the area.

BRIEF DESCRIPTION OF THE DRAWINGS

FIG. 8 is a first table showing a percentage of TSV usage as a function of the dimensions of a window;

FIG. 9 is a second table showing wire length increase as a function of the dimensions of a window;

FIG. 10 is a third table showing horizontal wire length increase as a function of the dimensions of a window;

FIG. 11 is a fourth table showing vertical wire length increase as a function of the dimensions of a window;

DETAILED DESCRIPTION

Figure 1:
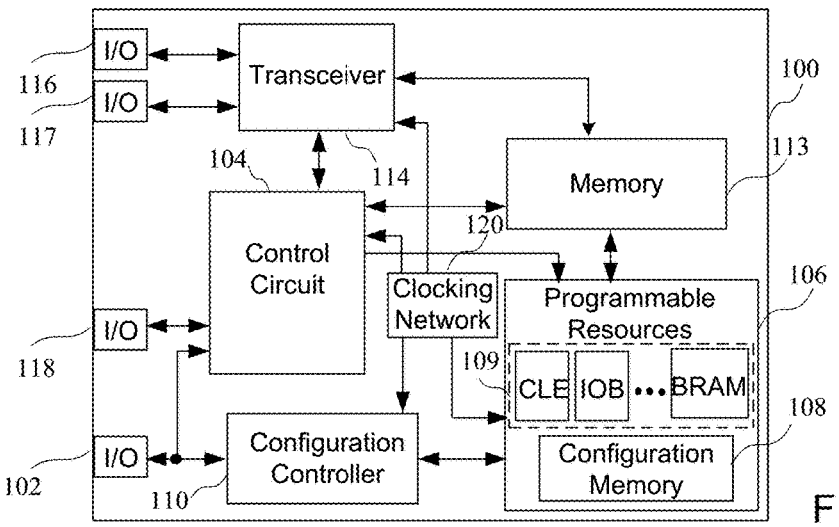
FIG. 1 is an exemplary block diagram of an integrated circuit having programmable resources.

The systems and methods set forth below use window-based partitioning on a circuit design placed on a stacked integrated circuit (IC) device to control the number of cuts (i.e. electrical connections in the Z-direction) between chips of the stacked integrated circuit device and to minimize wire length growth due to the use of multiple chips in stacked IC device.

The systems and methods address a problem of the overuse of Z resources (e.g. TSVs) in an integrated circuit device. While design partitioning could be used and minimize cuts across the layers, design partitioning may also cause all gains of reduced wire length to be lost. Further, while post placement swap-based optimization could be performed, where the Z cuts could be reduced by swapping localized logic from layer to layer in areas of high Z cut use, swap-based algorithms generally have local minima problems and only tend to reduce cuts on nets of low pin counts as they are moving a small set of logic using the swap-based algorithm. By using a partition window to ensure that a number of Z-resources is not exceeded, wire length growth of an IC device having multiple chips may be controlled.

The minimization of wire length growth is desired to maintain a reduction of routing resources on each chip, thus reducing cost of the stacked IC device. While the systems and methods set forth below can be implemented with any type of multi-chip IC, the systems and methods could be used for Active-on-Active (AOA) silicon stacking, which enables the chips to be stacked in very close proximity. In AoA technology, IC chips are bonded together, creating a set of chips stacked on top of each other. The chips communicate through TSVs, such as BTSVs (Backside Thru Silicon Vias) which are used, in one case, to connect the routing fabric across all chip layers. The number of these BSTV connections (which may be referred to as Z cuts or Z connections) is dependent on the size of the X, Y area of the chip that they go through. For example, in an architecture having 7 nm transistor dimensions, the number of BTSVs can range from 32 to 64 per tile, depending on how the BTSVs are connected to fabric of the chips.

One benefit of stacking the chips is that logic, such as in programmable logic devices (PLDs), may be placed much closer together because CLBs sit on top of CLBs rather than next to each other. For example, having two layers of fabric generally doubles the CLB size in the X, Y orientation and doubles the routing in a conventional device. However, by using resources that enable connections in the Z direction (such as BTSVs), net loads and drivers may be placed closer together and nets may be routed with shorter length resources. This use of resources in the Z direction makes it possible to reduce routing resources on each chip, thus reducing metal layer requirements and cost. Further, a multi-stack device with same capacity as a monolithic device is more routable provided that the number of Z connections is not exceeded (i.e. more net cuts required across layers then Z resources).

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Turning first to FIG. 1, a block diagram of an integrated circuit device 100 having programmable resources is shown. In particular, an input/output port 102 is coupled to a control circuit 104 that controls programmable resources 106 having configurable logic elements 109. Configuration data may be provided to the configuration memory 108 by a configuration controller 110. The configuration data enables the operation of the programmable resources 106. A memory 113 may be coupled to the control circuit 104 and the programmable resources 106. A transceiver circuit 114 may be coupled to the control circuit 104, programmable resources 106 and the memory 113, and may receive signals at the integrated circuit by way of I/O ports 116 and 117. Other I/O ports may be coupled to circuits of the integrated circuit device, such as I/O port 118 that is coupled to the control circuit 104 as shown. A clocking network 120 is coupled to various elements of the circuit of FIG. 1. The integrated circuit device of FIG. 1 may be implemented in a multi-chip integrated circuit device having chips stacked in a vertical arrangement as will be described in more detail below. While an integrated circuit device having programmable resources is shown by way of example, it should be understood that the system and methods set for below could be implemented in any type of integrated circuit device. Further, additional details related to an integrated circuit having programmable resources is provided in reference to FIG. 12.

Figure 2:
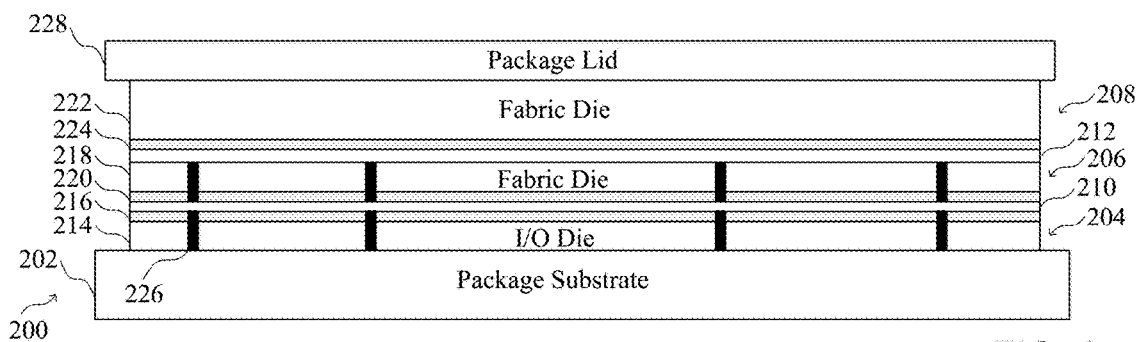
FIG. 2 is a cross-sectional view of an integrated circuit device.

Turning now to FIG. 2, a cross-sectional view of an integrated circuit device is shown. The integrated circuit 200 comprises a package substrate 202 having a plurality of stacked IC chips. More particularly, the example implementation of FIG. 2 comprises 3 IC chips 204, 206, and 208, although the systems and methods could be implemented with any number of chips. The chips are configured to enable communication between the chips, such as through the use of vias of the chips and connecting elements between the chips, including contact elements 212 and 212. As shown in FIG. 2, the first IC chip 204 comprises a plurality of metal layers 214 formed on an active region 216, and the second IC chip 206 comprises a plurality of metal layers 218 formed on an active region 220, where first IC chip and the second IC chip are connected by contact elements 210. The third IC chip 208 comprises a plurality of metal layers 222 formed on an active region 224. The plurality of metal layers generally includes traces and vias that enable the communication of signals within an IC chip. Vias 226, such as BTSVs, enable the communication of signals between the IC chips of the integrated circuit device having a package lid 228. While the arrangement of IC chips of FIG. 2 shows one example arrangement showing face or backside connections of the chips, it should be understood that the IC chips could be implemented in other arrangements.

Figure 3:
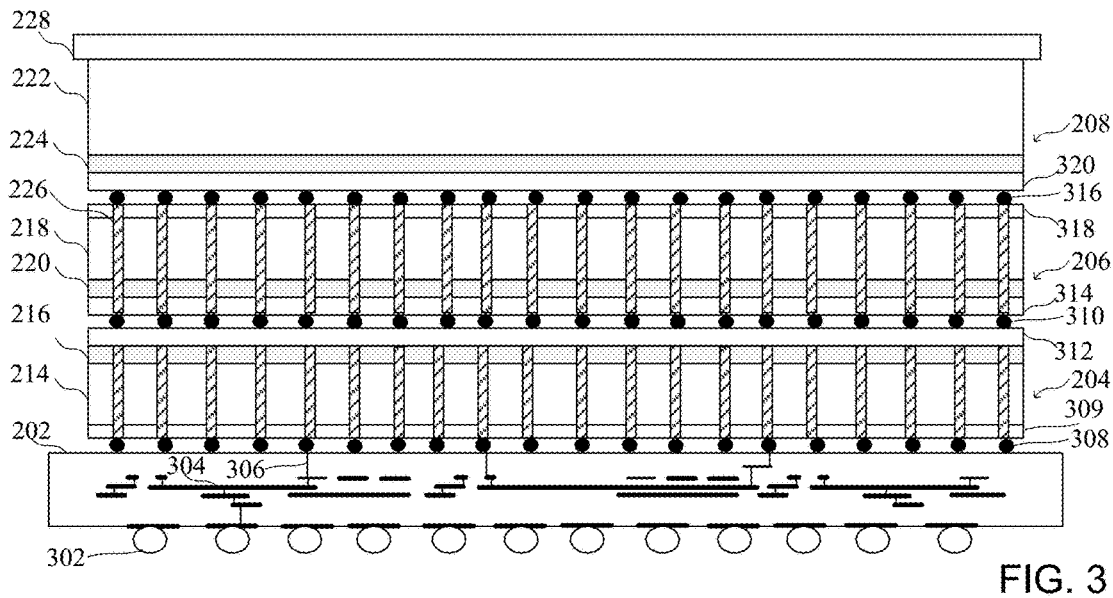
FIG. 3 is another cross-sectional view of an integrated circuit device.

Turning now to FIG. 3, another cross-sectional view of an integrated circuit device is shown, where the exemplary arrangement of FIG. 3 shows specific connections and vias that can be used to reduce the lengths of the traces, as will be described in more detail below. More particularly, contact elements 302, shown here by way of example as solder balls, on the substrate 202 may be electrically connected to the IC chips by way of traces 304 and vias 306. Contact elements 308, shown here as solder bumps, enable connections between the package substrate 202 and contact elements of a contact layer 309. Contact elements 310, shown here as solder bumps, enable connections between the chip 204 and the chip 206 by way of contact layers 312 and 314. Contact elements 316, shown here as solder bumps, enable connections between the chip 208 and the chip 206 by way of contact layers 318 and 320.

Rather than implementing multiple chips in a horizontal arrangement on an interposer as in some conventional multi-chip modules, the chips are stacked vertically (i.e. in the Z-direction). By stacking the chips vertically, circuit elements of the two chips can be closer together compared to an arrangement where the chips are next to each other on an interposer. That is, by implementing connections by way of vias, such as BSTVs, between the stacked chips (i.e. in the Z direction or vertical direction in FIG. 3 as shown), the distance between circuit elements in the two chips is shorter compared to chips arranged adjacent to one another horizontally. It should be noted that when using AoA integrated circuit devices, the backside of the chip can be thinned or removed during that formation of the IC chips, reducing the thickness of the chips, and therefore reducing the distance that signals need to travel between circuits in different chips that are stacked in the IC.

Figure 4:
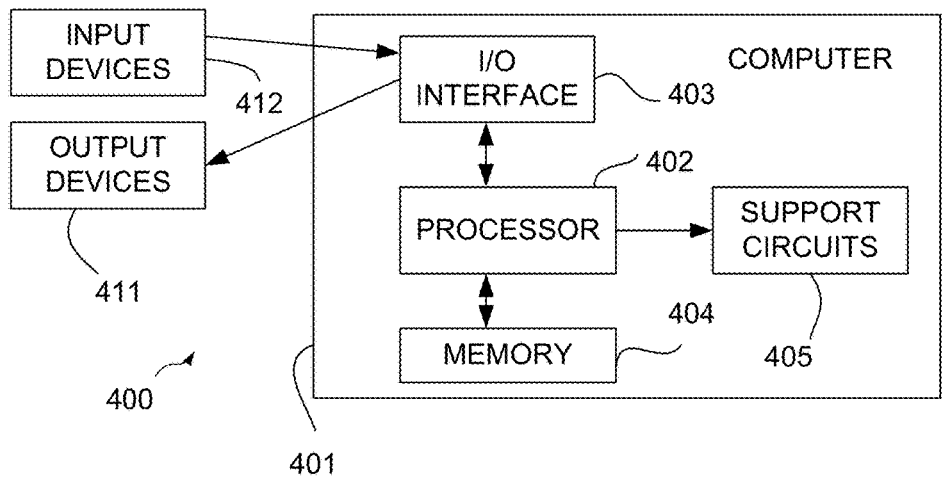
FIG. 4 is a block diagram of a system 400 having a computer 401 suitable for implementing the processes and methods described herein.

Turning now to FIG. 4, a block diagram depicting an illustrative example of a system 400 having a computer 401 suitable for implementing the processes and methods described herein. For example, the computer 401 may be used to implement the system 500 of FIG. 5, as well as the methods of FIGS. 10 and 11. The computer 401 includes a processor 402, a memory 404, various support circuits 405, and an I/O interface 403. The processor 402 may be any type of microprocessor known in the art. The support circuits 405 for the processor 402 include conventional cache, power supplies, clock circuits, data registers, I/O interfaces, and the like. The I/O interface 403 may be directly coupled to the memory 404 or coupled through the processor 402. The I/O interface 403 may be coupled to various input devices 412 and output devices 411, such as a conventional keyboard, mouse, printer, display, and the like.

The memory 404 stores all or portions of one or more programs and/or data to implement the systems and methods described herein. Although one or more aspects of the present disclosure are disclosed as being implemented as a computer executing a software program, those skilled in the art will appreciate that the present disclosure may be implemented in hardware, software, or a combination of hardware and software. Such implementations may include a number of processors independently executing various programs and dedicated hardware, such as ASICs.

The computer 401 may be programmed with an operating system, which may be OS/2, Java Virtual Machine, Linux, Solaris, Unix, Windows, among other known platforms. At least a portion of an operating system may be disposed in the memory 404. The memory 404 may include one or more of the following random access memory, read only memory, magneto-resistive read/write memory, optical read/write memory, cache memory, magnetic read/write memory, and the like, as well as signal-bearing media as described below.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the methods of selecting routing resources in an integrated circuit device. In one embodiment, instructions and data for the present methods (e.g., a software program comprising computer-executable instructions) can be loaded into memory 404 and executed by the processor 402, e.g., a hardware processor, to implement the steps, functions or operations of the methods. Furthermore, when a hardware processor executes instructions to perform "operations," this could include the hardware processor performing the operations directly and/or facilitating, directing, or cooperating with another hardware device or component (e.g., a co-processor and the like) to perform the operations.

An aspect of the present disclosure is implemented as a program product for use with a computer system. Program(s) of the program product defines functions of examples and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter example specifically includes information downloaded from the Internet and other networks. Such signal-bearing media, when carrying computer-readable instructions that direct functions of the present disclosure, represent examples of the present disclosure.

The processor executing the computer readable or software instructions relating to the above described method can be perceived as a programmed processor or a specialized processor. As such, the present method 500 (including associated data structures) of the present disclosure can be stored on a tangible or physical (broadly "non-transitory") computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

Figure 5:
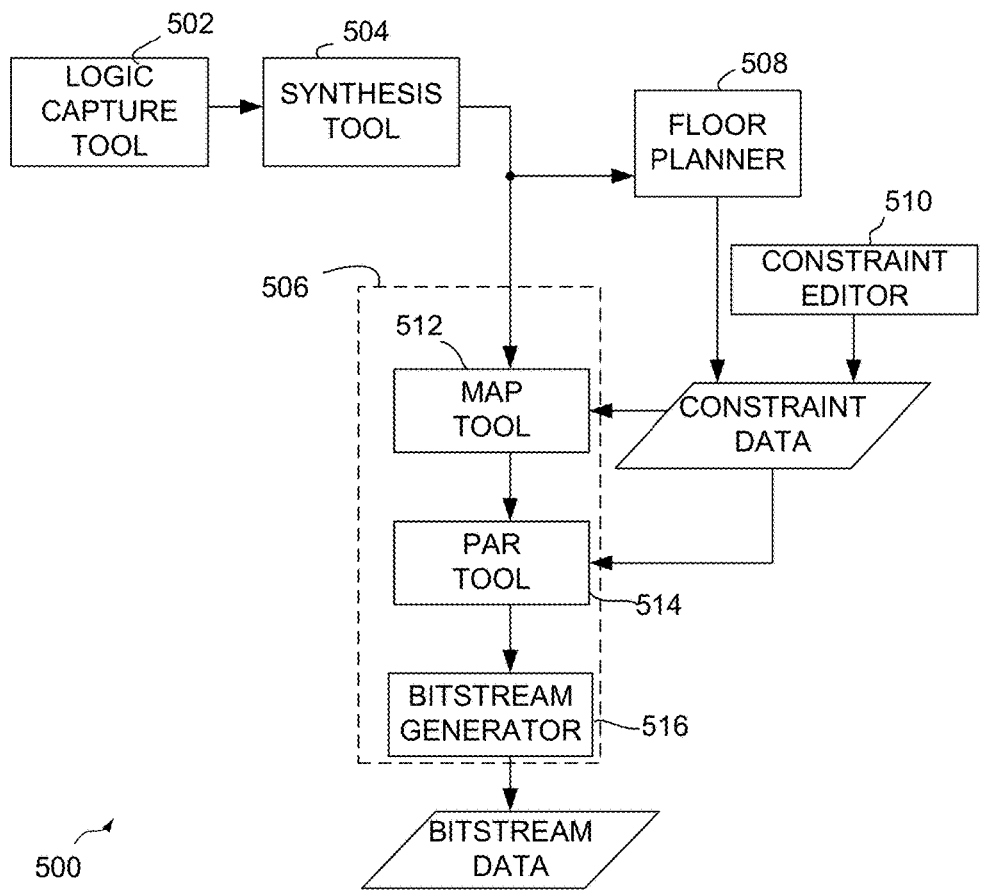
FIG. 5 is an illustrative example of a logic design system for a programmable logic device (PLD)

Turning now to FIG. 5, an illustrative example of a logic design system for a PLD in accordance with one or more aspects of the present disclosure is shown. FIG. 5 is a block diagram depicting an illustrative example of a logic design system 500 for a programmable logic device (PLD) in accordance with one or more aspects of the present disclosure. The system 500 includes a logic capture tool 502, a synthesis tool 504, a floorplanner 508, a constraint editor 510, and an implementation tool 506. In the present example, the system 500 is configured to implement a logic design using a target FPGA. Accordingly, the implementation tool 506 includes a map tool 512, a place-and-route (PAR) tool 514, and a bitstream generator 1211. The system 500 may be implemented using the computer 400 for example. Notably, the tools may be part of one or more software programs stored in a memory and configured for execution by a central processing unit (CPU).

According to some aspects of the systems and methods of selecting routing resources in a multi-chip integrated circuit device, the placement of the circuit resources of the integrated circuit may be iteratively modified to avoid having more cuts between 2 chips than are allowed for a particular region. The PAR tool 514 provides both placement and routing. However, before describing the placement process for selecting routing resources in a multi-chip integrated circuit device according to various aspects of the invention, an exemplary description of the process of laying out an integrated circuit device, including the placement and routing of a circuit in an integrated circuit device, is described. The system 500 processes the circuit design through a design flow including routing. Implementing a circuit design within an IC, whether a programmable IC or an application specific IC (ASIC), entails processing the circuit design through the design flow. The design flow includes multiple, different phases. These phases generally include synthesis, placement, and routing.

Synthesis refers to the process of converting, or translating, an abstract, programmatic description of a circuit into a low-level design implementation. The abstract, programmatic description of the circuit describes behavior of the circuit and is also referred to as a "behavioral description" or a "register transfer level (RTL) description" of the circuit. The behavioral description is often specified using an HDL. The low-level design implementation generated through synthesis typically is specified as inter-connected logic gates.

Synthesis may also include mapping. Mapping is the process of correlating, or matching, the logic gates of the low-level circuit design to the various types of physical circuit blocks that are actually available in the particular IC in which the circuit design is to be implemented, i.e., the "target IC." For example, since a lookup table (LUT) may implement a complex function, one or more logic gates of the low-level design implementation may be mapped to a single LUT, or other programmable tile of the target IC. The mapped circuit design specifies the same functionality as the low-level design implementation, albeit in terms of the particular circuit blocks available on the target IC as opposed to low-level logic gates.

Placement is the process of assigning elements of the synthesized circuit design to particular instances of circuit blocks and/or resources having specific locations on the target IC. Once placed, a circuit element of the circuit design has a specific location on the target IC as opposed to only being assigned to a particular type of circuit block and/or resource as is the case after mapping and prior to placement. The location of a circuit element of a circuit design, once placed, is the location on the target IC of the instance of the circuit block and/or resource to which the circuit element is assigned. Routing is the process of selecting particular routing resources such as wires, programmable interconnection points (PIPs), PIP settings, and/or other interconnect circuitry to electrically couple the various circuit blocks of the target IC after placement.

One large benefit of stacking chips in an IC device is that logic may be placed much closer together as chips sit on top of chips in the Z direction. For example having two layers of fabric doubles the CLB size in the X, Y orientation and doubles the routing. By stacking the chips in the Z direction, net loads and drivers are not as far apart and nets may be routed with shorter length resources by using Z resources (e.g. BTSV). As a result, it possible to reduce routing resources on each chip, thus reducing metal layer requirements and cost. A multi stack device is more routable than a monolithic device having the same capacity as long as the number of Z connections do not exceed a maximum number of Z connections and are therefore within the maximum number of Z connections (i.e. more net cuts across layers in that area than Z resources that are available in that area). The systems and methods for enabling selecting routing resources in a multi-chip integrated circuit device enable reducing the wire lengths of traces used to connect chips of the integrated circuit device, and therefore reduce the metal routing requirements and improve performance of the integrated circuit device.

It is possible to run placement algorithms ignoring the Z connectivity restrictions in order to get maximum X,Y wire length reduction. However, this may generate a placement that requires more Z transitions (nets cut across layers) than are available. As such design placement has to guarantee, such a placement cannot be made or the design will be un-routable. The systems and method for selecting routing resources for a multi-chip IC as described in more detail below can improve the placement of the design by minimizing wire lengths of traces or other contact elements necessary to connect elements of the circuit design, but also maximize the use of Z-cuts without exceeding the amounts of Z cuts. According to one implementation, window-based partitioning is used in the areas of the logic placement that require reduction of the use of Z resources. By varying the size of the window being used, it is possible to trade off X, Y wire length for Z cut reduction. Further, by varying the window in different aspect ratios, it is possible to control whether more wire length is added in either the X or Y direction, which can be critical based on routing structure that is available. For example, chips of a particular IC device may have twice the routing resources in the vertical direction compared to the horizontal direction. Therefore, it might be beneficial to trade off vertical wire length for reduced Z connectivity. Window-based partitioning also allows for many of the local minima issues present in swap-based methods because the partitioner works on a larger problem of simultaneously dealing with all nets at once during placement.

From a production point of view, it may be beneficial to analyze the Z-cut densities, where areas of overuse/high use would be processed based on experimental results. The use of experimental results minimizes overall wire length growth and only reduces Z-cut use where required. To utilize experimental results properly for design optimization, it would be necessary to analyze results based on how the router algorithm utilizes the Z resources. These resources can be used for reasons other than just being able to route nets which are cut across layers, such as to detour around congestion in a single layer (i.e. a single chip of the stacked chips).

Figure 6:
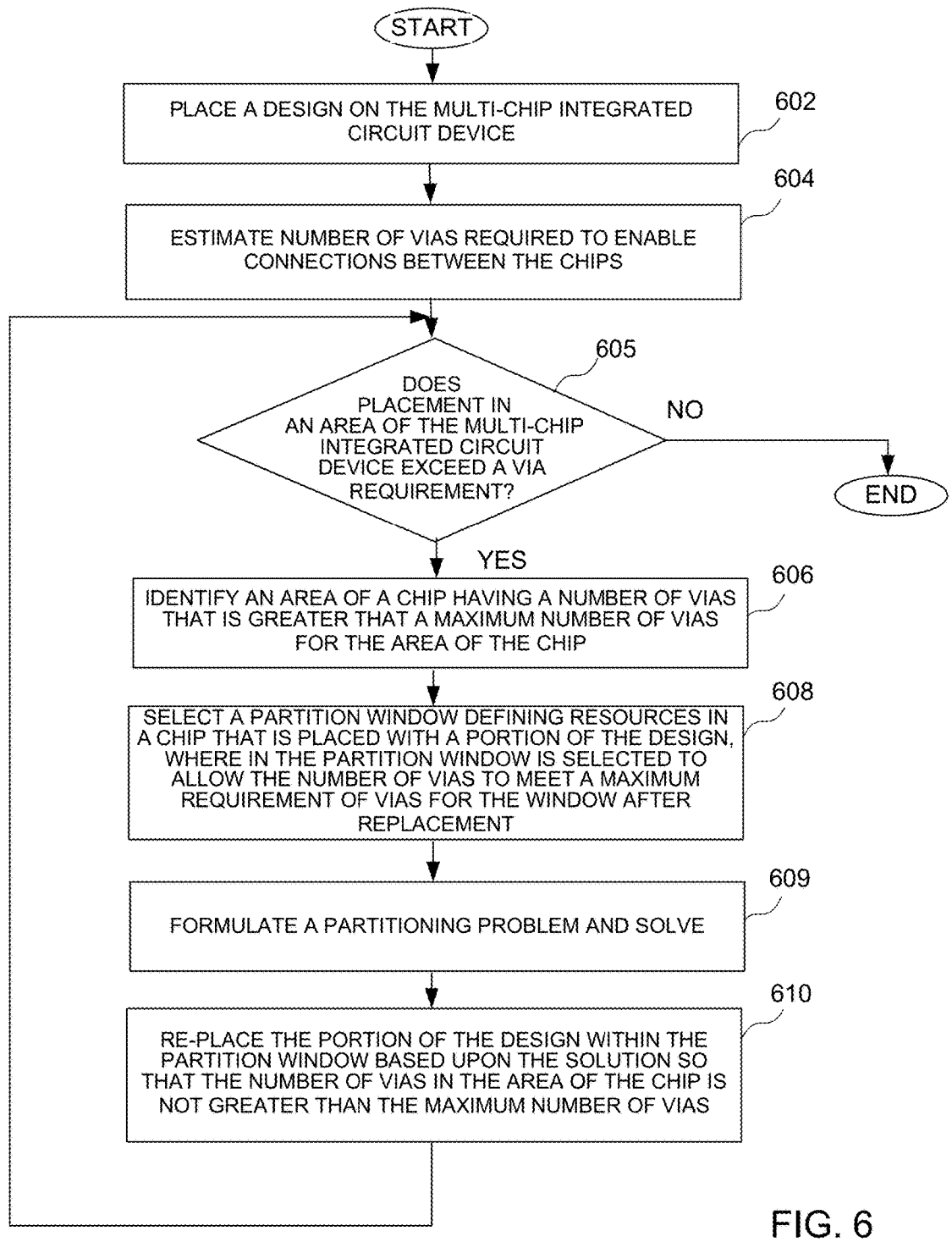
FIG. 6 is a flow chart showing a method of selecting routing resources of a multi-chip integrated circuit device.

Turning now to FIG. 6, a flow chart shows a method of selecting routing resources of a multi-chip integrated circuit device. A design is placed on the multi-chip integrated circuit device at a block 602. An estimate of the number of vias required to enable connections between the chips is made at a block 604. It is determined whether placement in an area of a multi-chip IC device exceeds a via requirement at a block 605. That is, it is then determined whether there are areas of a chip having a number of Z connections, described by way of example as vias, that is greater than a maximum number of vias for the area of the chip. If not, the process is ended. If so, an area of the chip having a number of vias that is greater than a maximum number of vias for the area of the chip is identified at a block 606. A partition window defining resources in a chip that is placed with a portion of the design is selected at a block 608, where in the partition window is selected to allow the number of vias to meet a maximum requirement of vias for the partition window after re-placement. A portioning problem is formed and solved at a block 609. The portion of the design within the partition window is re-placed based upon the solution so that the number of vias in the area of the chip is not greater than the maximum number of vias for the area at a block 610.

Figure 7:
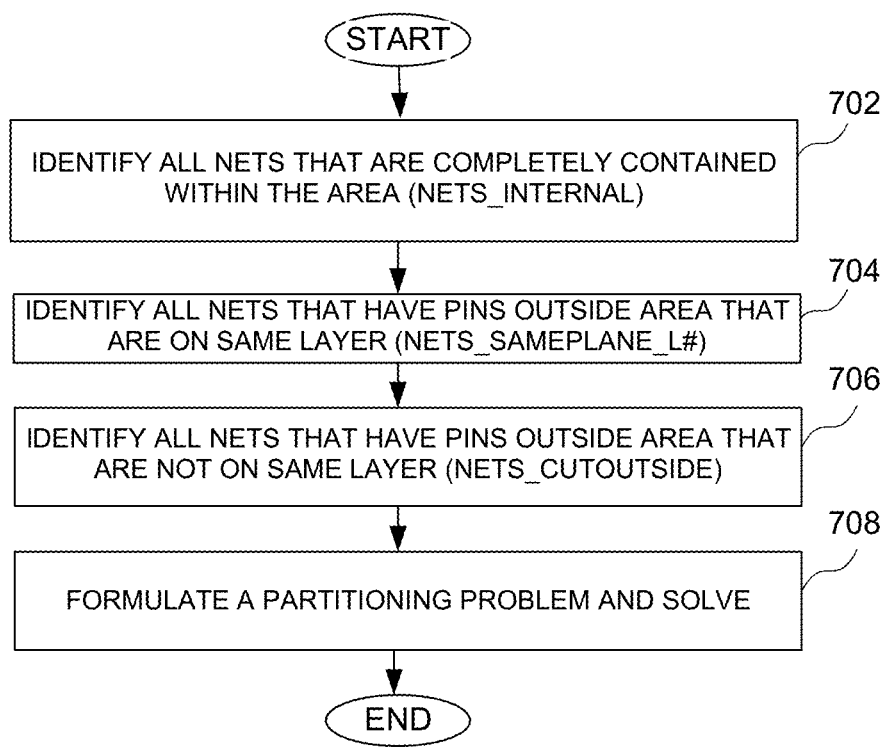
FIG. 7 is a flow chart showing a method for creating and solving a partitioning problem to reduce through silicon via (TSV) usage while controlling wire length (WL) growth as a function of the dimensions of a window.

Turning now to FIG. 7, a flow chart shows a method for creating and solving a partitioning problem to reduce TSV usage while controlling wire length growth as a function of the dimensions of a window. A netlist is a list of terminals or pins of components in a circuit and electrical connectors that interconnect the terminals. Nets represent the electrical traces and vias of metal layers of an IC that connect the pins. All nets that are completely contained within the area (NETS_INTERNAL) are identified at a block 702. All nets that have pins outside area that are on same layer (NETS_SAMEPLANE_L#) are identified at a block 704. All nets that have pins outside the area that are not on same layer (NETS_CUTOUTSIDE) are identified at a block 706.

A partitioner problem is formulated and solved at a block 708. By way of example, the partitioner problem may identify a maximum utilization/allowable variance of utilization for areas of the chips. That is, a certain percentage of resources in an area, such as a given percentage of CLBs in the area, may be allowed to be utilized. NETS_INTERNAL to have cuts minimized are also identified. The nets in the same plane (NETS_SAMEPLANE_#L) to have cuts minimized are identified and locked to a plane (PLANE L#). All nets that already have cuts are ignored. The placement problem is then solved, where logic on the planes defined to the solution are placed as close to original X,Y locations as possible.

It should be noted that, for much of the device, nets can be added with external loads that have not already been locked down to NETS_INTERNAL in order to allow the cuts associated with them to be minimized. If pins outside of area that have been processed are in same plane, they can be treated as nets in the same plane (NETS_SAMEPLANE_L#). If some connections are more important for timing reasons to be on same plane, or on different planes but have close weighting on connections, it is possible to induce a partitioner to achieve these goals. A post pass WL minimization could be made in an iterative approach to reduce WL further.

Partitioners may also have different capabilities, and may lead to some different steps in determining the placement of a design. For example, it may be necessary when using a bi-partitioner to recurse on the algorithm and manage nets that are cut properly once between partitions, where other passes should not process them but treat them as nets cut outside (NETS_CUTOUTSIDE).

The various elements of the method of FIGS. 6-7 may be implemented using the circuits of FIGS. 1-5 as described, or using some other suitable circuits. While specific elements of the method are described, it should be understood that additional elements of the method, or additional details related to the elements, could be implemented according to the disclosure of FIGS. 1-5. While example arrangements of IC chips of multi-chip IC device are shown, it should be noted that the systems and methods of selecting routing resources in an IC device could be used in other 3D device implementations assuming a similar place and route problem exists.

Example results were generated for a 4-layer device with a design utilizing 87% of the slices using a tile based optimizer. The tables of FIGS. 8-11 show the effects of the selection of a partition window to ensure that a number of vias in an area does not exceed a predetermined maximum for the area. An initial placement of a circuit design can be made with no regard for Z connections. FIG. 8 shows a percentage of Z-cuts used as a function of partition windows defined by both horizontal and vertical dimensions (where the horizontal and vertical dimensions could relate to any of the criteria for defining a window as described above). As shown in FIG. 8, an original placement leads to Z-cuts in a region that exceed a maximum number of Z-cuts allowable in that region (i.e. greater 119 as shown in the upper left box). It can be seen that as different windows are defined, the number of Z-cuts for the region is reduced. As shown by the box that is encircled by way of example, required Z-cuts using 97 percent of the available Z-cuts can be achieved with a 2×4 partition window as shown in the highlighted box. While many different dimensions can be selected leading to different numbers of Z-cuts, the wire length requirements will increase, as described below in reference to FIGS. 9-11.

More particularly, an increase in total wire length as a function of the horizontal dimensions of a partition window as shown in FIG. 9. For example, the total wire length in a region is originally 100 (i.e. 100%), and 104 would indicate 104% or a 4 percent increase in wire length by using a partition larger partition window (and therefore fewer Z-cuts in an original region in which a portion of a design is placed). As can be seen in FIG. 9, as the dimensions of the horizontal and vertical dimensions of the partition window increase, ensuring that the Z-cuts will be less than a maximum number of Z-cuts in the window, the wire length of the portion of the design placed in the region will also increase (with the greatest increase being in the lower right corner of the table). By selecting the window shown in the highlighted box (i.e. having a horizontal dimension of 2 and a vertical dimension of 1), there is only a 4% increase in the wire lengths when the number of Z-cuts is reduced to 97% of the maximum allowable Z-cuts.

FIGS. 10 and 11 show how changes in wire lengths may vary differently depending on changes in the horizontal direction versus the vertical direction. It also shows that it is possible can control vertical verses horizontal WL growth by the aspect ratio of the window. More particularly, the wire length increases more with changes in the horizontal direction compared to changes in the vertical direction in the implementation of FIG. 10, while wire length increases more with changes in the vertical direction compared to changes in the horizontal direction in the implementation of FIG. 11. That is, depending upon the properties of the chips that are used in the integrated circuit device, the aspect ratio should be chosen to make it easier to implement the Z cuts while minimizing the increase in wire lengths. In a device having properties where the wire length increases more for partition windows with larger dimensions in the horizontal direction, the partition window should be chosen to have an aspect ratio with a larger vertical dimension than horizontal direction. In a device having properties where the wire length increases more for partition windows with larger dimensions in the vertical direction, the partition window should be chosen to have an aspect ratio with a larger horizontal dimension than vertical direction. By maximizing Z-cuts and minimizing wire lengths, the performance of the stacked, multi-chip IC device can be improved.

Figure 12:
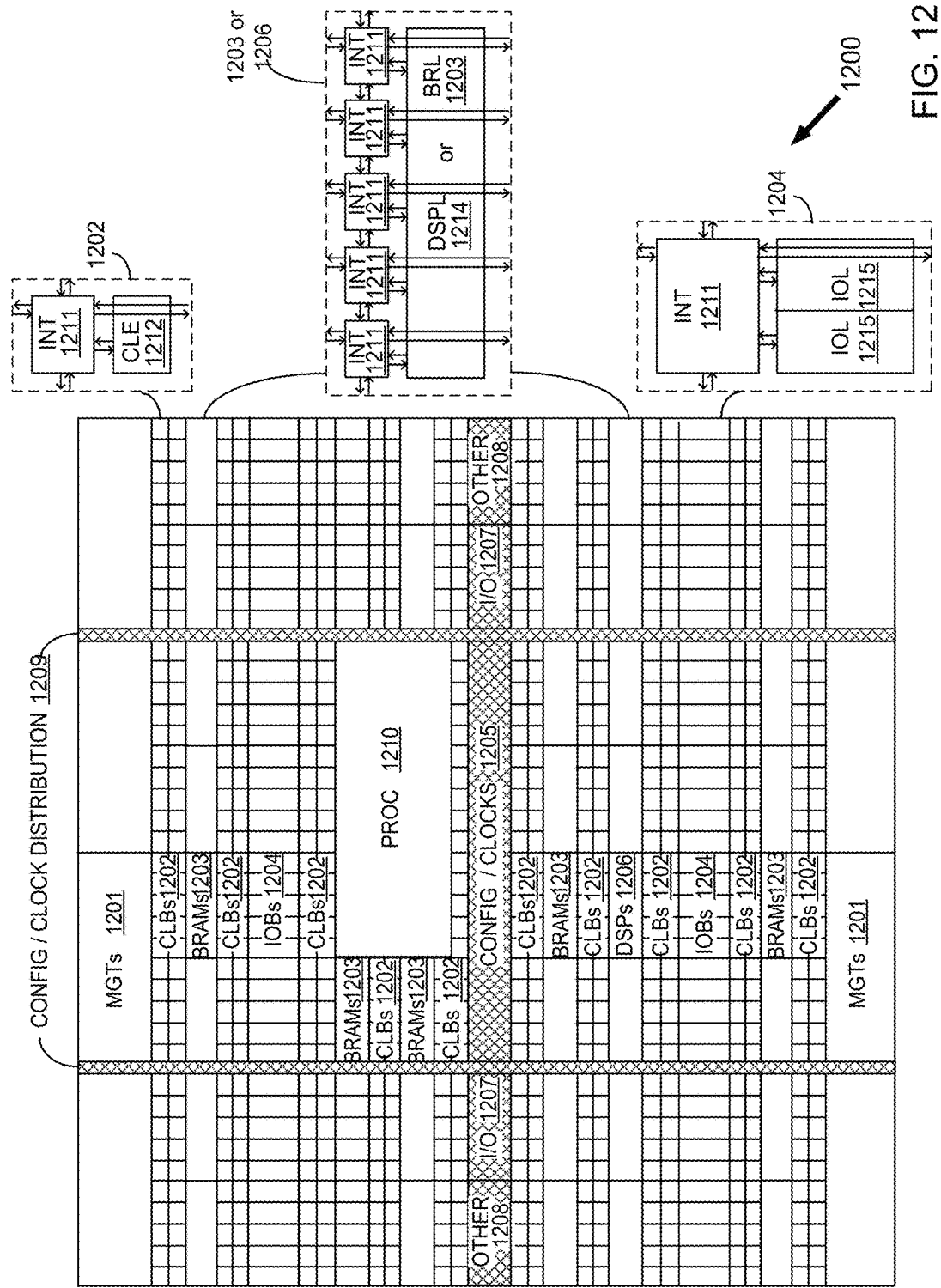
FIG. 12 is another example of a block diagram of an integrated circuit having reconfigurable circuits.

Turning now to FIG. 12, another example of a block diagram of an integrated circuit having reconfigurable circuits which may be implementing as one of the chips is shown. While devices having programmable resources may be implemented in any type of integrated circuit device, such as an application specific integrated circuit (ASIC) having programmable resources, other devices comprise dedicated programmable logic devices (PLDs). One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., Flash memory, as in some CPLDs), or in any other type of memory cell.

The device of FIG. 12 comprises an FPGA architecture 1200 having a large number of different programmable tiles including multi-gigabit transceivers (MGTs) 1201, CLBs 1202, random access memory blocks (BRAMs) 1203, input/output blocks (IOBs) 1204, configuration and clocking logic (CONFIG/CLOCKS) 1205, digital signal processing blocks (DSPs) 1206, specialized input/output blocks (I/O) 1207 (e.g., configuration ports and clock ports), and other programmable logic 1208 such as digital clock managers, analog-to-digital converters, system monitoring logic, and so forth. Some FPGAs also include dedicated processor blocks (PROC) 1210, which may be used to implement a software application, for example.

In some FPGAs, each programmable tile includes a programmable interconnect element (INT) 1211 having standardized connections to and from a corresponding interconnect element in each adjacent tile. Therefore, the programmable interconnect elements taken together implement the programmable interconnect structure for the illustrated FPGA. The programmable interconnect element 1211 also includes the connections to and from the programmable logic element within the same tile, as shown by the examples included at the top of FIG. 12.

For example, a CLB 1202 may include a configurable logic element (CLE) 1212 that may be programmed to implement user logic plus a single programmable interconnect element 1211. A BRAM 1203 may include a BRAM logic element (BRL) 1213 in addition to one or more programmable interconnect elements. The BRAM includes dedicated memory separate from the distributed RAM of a configuration logic block. Typically, the number of interconnect elements included in a tile depends on the height of the tile. In the pictured implementation, a BRAM tile has the same height as five CLBs, but other numbers may also be used. A DSP tile 1206 may include a DSP logic element (DSPL) 1214 in addition to an appropriate number of programmable interconnect elements. An 10B 1204 may include, for example, two instances of an input/output logic element (IOL) 1215 in addition to one instance of the programmable interconnect element 1211. The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor.

In the pictured implementation, a columnar area near the center of the chip is used for configuration, clock, and other control logic. The config/clock distribution regions 1209 extending from this column are used to distribute the clocks and configuration signals across the breadth of the FPGA. Some FPGAs utilizing the architecture illustrated in FIG. 12 include additional logic blocks that disrupt the regular columnar structure making up a large part of the FPGA. The additional logic blocks may be programmable blocks and/or dedicated logic. For example, the processor block PROC 1210 shown in FIG. 12 spans several columns of CLBs and BRAMs.

Note that FIG. 12 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 12 are purely exemplary. For example, in an actual FPGA more than one adjacent column of CLBs is typically included wherever the CLBs appear in order to facilitate the efficient implementation of user logic. While the implementation of FIG. 12 relates to an integrated circuit having programmable resources, it should be understood that the circuits and methods set forth in more detail below could be implemented in any type of ASIC.

It can therefore be appreciated that new circuits for and methods of selecting routing resources of a multi-chip integrated circuit device have been described. It will be appreciated by those skilled in the art that numerous alternatives and equivalents will be seen to exist that incorporate the disclosed invention. As a result, the invention is not to be limited by the foregoing implementations, but only by the following claims.

What is claimed is:

1. A method of selecting routing resources in a multi-chip integrated circuit device, the method comprising:
   placing a design on the multi-chip integrated circuit device;
   estimating a number of vias required to enable connections between chips of the multi-chip integrated circuit device that is placed with a portion of the design;
   identifying an area of a chip having a number of vias that is greater than a maximum number of vias for the area of the chip;
   selecting a partition window defining resources in the chip that is placed with the portion of the design, where in the partition window is selected to allow the number of vias to meet a maximum requirement of vias for the partition window; and
   re-placing the portion of the design within the partition window so that the number of vias in the area of the chip is within the maximum number of vias for the area.

2. The method of claim 1, wherein placing a design on the multi-chip integrated circuit device comprises placing a design in chips of an active-on-active multi-chip integrated circuit device.

3. The method of claim 1, wherein selecting partition window comprises selecting at least one of a geometric area of the chip, a set of resources of the chip, and a plurality of tiles of the chip.

4. The method of claim 1, further comprising controlling wire length growth based upon the selection of the partition window.

5. The method of claim 4, wherein controlling wire length growth comprises controlling wire length growth in both a horizontal direction and a vertical direction.

6. The method of claim 1, wherein selecting a partition window comprises selecting a partition window having a first number of horizontal tiles and a second number of vertical tiles.

7. The method of claim 1, further comprising determining another area of the chip having a number of vias that is greater than a maximum number of vias for the other area of the chip.

8. The method of claim 1, further comprising identifying nets that are completely contained within the area of the chip and nets that have pins outside the area.

9. The method of claim 1, wherein selecting a partition window comprises identifying portions of the partition window that have a maximum utilization of resources within the partition window.

10. The method of claim 9, wherein selecting a partition window comprises identifying nets completely contained within the area to have cuts minimized.

11. A system comprising:
a processor; and
a computer-readable medium storing instructions which, when executed by the processor, cause the processor to perform operations, the operations comprising:
placing a design on the multi-chip integrated circuit device;
estimating a number of vias required to enable connections between chips of the multi-chip integrated circuit device that is placed with a portion of the design;
identifying an area of a chip having a number of vias that is greater than a maximum number of vias for the area of the chip;
selecting a partition window defining resources in the chip that is placed with the portion of the design, where in the partition window is selected to allow the number of vias to meet a maximum requirement of vias for the partition window; and
re-placing the portion of the design within the partition window so that the number of vias in the area of the chip is within the maximum number of vias for the area.

12. The system of claim 11, wherein selecting partition window comprises selecting at least one of a geometric area of the chip, a set of resources of the chip, and a plurality of tiles of the chip.

13. The system of claim 11, further comprising controlling wire length growth based upon the selection of the partition window.

14. The system of claim 13, wherein controlling wire length growth comprises controlling wire length growth in both a horizontal direction and a vertical direction.

15. The system of claim 11, wherein selecting a partition window comprises selecting a partition window having a first number of horizontal tiles and a second number of vertical tiles.

16. The system of claim 11, further comprising determining another area of the chip having a number of vias that is greater than a maximum number of vias for the other area of the chip.

17. A non-transitory computer-readable medium storing instructions which, when executed by a processor, cause the processor to perform operations, the operations comprising:
placing a design on the multi-chip integrated circuit device;
estimating a number of vias required to enable connections between chips of the multi-chip integrated circuit device that is placed with a portion of the design;
identifying an area of a chip having a number of vias that is greater than a maximum number of vias for the area of the chip;
selecting a partition window defining resources in the chip that is placed with the portion of the design, where in the partition window is selected to allow the number of vias to meet a maximum requirement of vias for the partition window; and
re-placing the portion of the design within the partition window so that the number of vias in the area of the chip is within the maximum number of vias for the area.

18. The non-transitory computer-readable medium of claim 17, further comprising identifying nets that are completely contained within the area of the chip and nets that have pins outside the area.

19. The non-transitory computer-readable medium of claim 18, wherein selecting a partition window comprises identifying portions of the partition window that have a maximum utilization of resources within the partition window.

20. The non-transitory computer-readable medium of claim 17, wherein selecting a partition window comprises identifying nets that are completely contained within the area to have cuts minimized.

* * * * *